April 8, 1958 F. J. HOLLENBACH 2,829,828
COMPUTING APPARATUS
Filed July 16, 1954 2 Sheets-Sheet 1

F. J. HOLLENBACH
INVENTOR.

BY Darby & Darby
ATT'YS

April 8, 1958     F. J. HOLLENBACH     2,829,828
COMPUTING APPARATUS
Filed July 16, 1954     2 Sheets-Sheet 2

F. J. HOLLENBACH
INVENTOR.

BY Darby & Darby
ATT'YS

United States Patent Office 2,829,828
Patented Apr. 8, 1958

2,829,828

COMPUTING APPARATUS

Frank J. Hollenbach, Hollis, N. Y., assignor to Emerson Radio and Phonograph Corporation, New York, N. Y., a corporation of New York Application July 16, 1954, Serial No. 443,737

6 Claims. (Cl. 235—61)

The present invention relates to an electrical computer circuit and particularly to such a computer circuit which can continuously compute the square root of the sum of any desired number of squared quantities, each of the quantities being represented by the angular displacement of a control shaft.

In many situations it is necessary to compute the square root of the sum of the squares of a number of quantities. In certain cases this must be done continuously and with extremely high accuracy, for example, in computers intended for aircraft detection or the automatic training of guns upon aircraft or other moving targets.

The present invention provides an apparatus and method for performing these operations of particularly high accuracy, having a limiting error not greater than twice the error in setting any one input quantity. The equipment is extremely simple and automatically and continuously provides an output of the indicated accuracy.

In addition, in such computer circuits, it is highly desirable to be able to use components which need not be matched to a high degree of accuracy. As an important feature of the present invention, trimming means are provided for making adjustments where components are not matched, while still retaining the advantages of the present invention.

Other objects and advantages of the present invention will be more clearly apparent from consideration of the following description taken in conjunction with the appended drawings in which.

Figure 1:
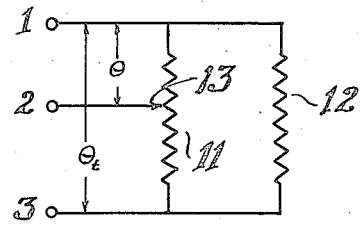
Figure 1 is a schematic circuit diagram useful in explaining the principles of the present invention.

Figure 1 shows a linear potentiometer 11 specially connected to generate a quadratic function of the angular displacement of a shaft. Thus, Figure 1 shows a potentiometer 11 of resistance R shunted by a fixed resistor 12 of the same resistance value. It will be understood that potentiometer 11 is of the linear type with end terminals 1 and 3, and having a control shaft whose rotation angularly displaces the variable tap 13 connected to terminal 2. If $\theta_t$ is the total possible angular travel of the potentiometer tap 13 from one extreme to the other, and $\theta$ is the angular displacement of the potentiometer tap 13 from one extreme, such as terminal 1 in Figure 1, then the total resistance between the terminals 2 and 3 of the potentiometer is given by the following equation:

$$R_{13} = \frac{\left[R\left(1-\frac{\theta}{\theta_t}\right)\right]\left[R\left(1+\frac{\theta}{\theta_t}\right)\right]}{R\left(1-\frac{\theta}{\theta_t}\right)+R\left(1+\frac{\theta}{\theta_t}\right)}$$

$$= \frac{R}{2}\left[1-\left(\frac{\theta}{\theta_t}\right)^2\right]$$

from which it will be seen that the total resistance $R_{23}$ is a quadratic function of the shaft displacement $\theta$.

Figure 2:
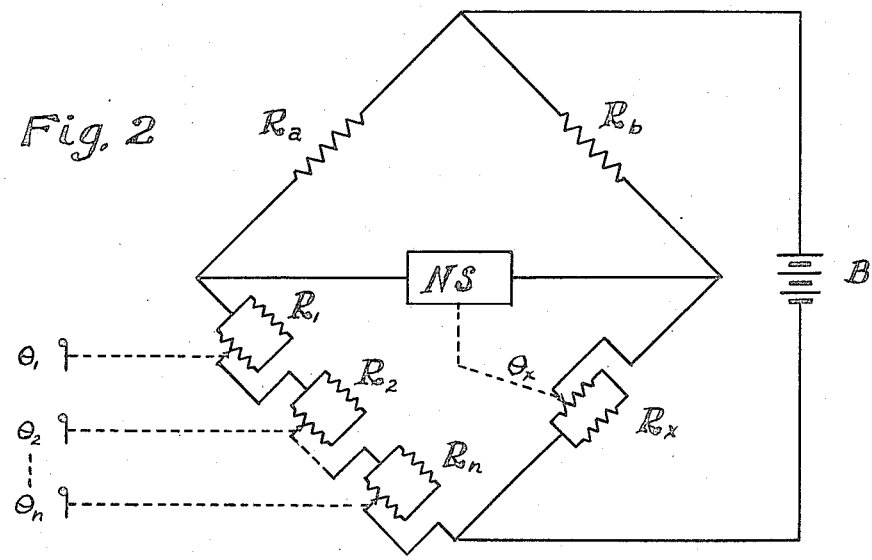
Figure 2 is a schematic circuit diagram of one form of computer for deriving the root of a sum of squares.

Figure 2 shows a Wheatstone bridge circuit having fixed resistors $R_a$ and $R_b$ in the upper arms thereof. The lower left arm is formed by a series connection of a plurality of quadratic resistors $R_1, R_2, \ldots R_n$ of the type shown in Figure 1, each resistance being individually settable by suitable controls designated schematically as $\theta_1, \theta_2, \ldots \theta_n$. It will be understood that these controls may be manually adjustable knobs or the like, or may be shafts coupled to other apparatus which determine the shaft positions as numerical quantities to be used in the computation to be effected by the present invention. The fourth bridge arm is also formed by a similar quadratic resistor $R_x$. It will be understood that all of these quadratic resistors are identical in construction and resistance value. A suitable voltage source (either A. C. or D. C.) indicated schematically by battery B is coupled across one diagonal of the bridge, and a null servo NS is coupled across the other diagonal. The null servo NS has its mechanical output connected to the variable tap of quadratic resistor $R_x$, and operates to adjust resistor $R_x$ until the bridge is balanced.

Figure 3:
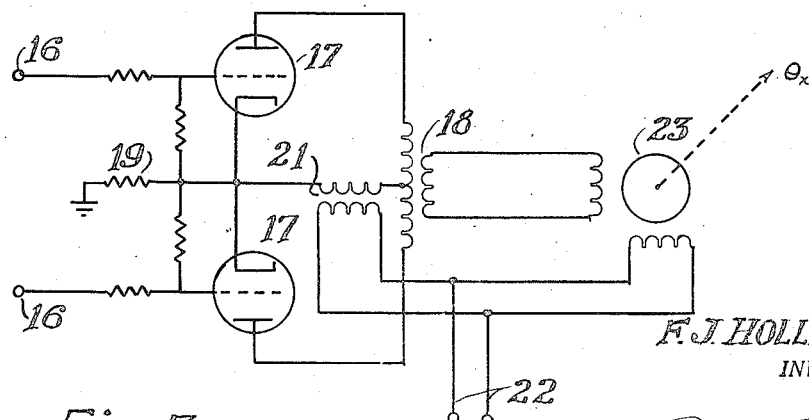
Figure 3 is a circuit digram of a null servo useful in the system of Figure 2.

Figure 3 shows a simple form which the null servo NS of Figure 2 may take, although it must be understood that any conventional form of null servo may be used here. The terminals 16 are coupled to the bridge diagonal, and lead to the respective grids of a pair of tubes 17, whose cathodes are grounded through a bias resistor 19 and whose anodes are connected to the terminals of a center tapped transformer 18. The tap of the transformer 18 is connected to the cathodes through the secondary of a transformer 21 whose primary is excited with A. C. from a suitable source 22. The secondary of transformer 18 feeds one winding of a two-phase motor 23 whose second winding is excited from source 22.

Hence, if the bridge is unbalanced, the potentials of the control grids of tubes 17 become unbalanced to excite motor 23 to rotate in a direction corresponding to the sense of unbalance of tubes 17. The shaft of motor 23 designated as $\theta_x$ is coupled to the tap of resistor $R_x$ and adjusts $R_x$ until the bridge is balanced, whereupon the motor becomes stationary.

Assuming that there are $n$ quadratic resistors in the lower left (or "input") arm of the bridge, each with the same total resistance R and the same total angle of travel $\theta_t$, then on balance $$\frac{\frac{R}{2}\left[1-\left(\frac{\theta_x}{\theta_t}\right)^2\right]}{R_b} = \frac{\frac{R}{2}\left[1-\left(\frac{\theta_1}{\theta_t}\right)^2\right] + \cdots + \frac{R}{2}\left[1-\left(\frac{\theta_n}{\theta_t}\right)^2\right]}{R_a}$$

(A)

or $$1-\left(\frac{\theta_x}{\theta_t}\right)^2 = \frac{R_b}{R_a}\left[n - \sum_{L=1}^{L=n}\left(\frac{\theta_L}{\theta_t}\right)^2\right]$$

$$= \frac{nR_b}{R_a} - \frac{R_b}{R_a}\sum_{L=1}^{L=n}\left(\frac{\theta_L}{\theta_t}\right)^2 \quad (B)$$

where $$\sum_{L=1}^{L=n}\left(\frac{\theta_L}{\theta_t}\right)^2 = \left(\frac{\theta_1}{\theta_t}\right)^2 + \left(\frac{\theta_2}{\theta_t}\right)^2 + \ldots + \left(\frac{\theta_n}{\theta_t}\right)^2 \quad (C)$$

If $R_a$ and $R_b$ are so chosen that $$\frac{R_b}{R_a} = \frac{1}{n}$$

Then, from (B)

$$1-\left(\frac{\theta_x}{\theta_t}\right)^2 = 1 - \frac{1}{n}\sum_{L=1}^{L=n}\left(\frac{\theta_L}{\theta_t}\right)^2 \quad (D)$$

and $$\theta_x^2 = \frac{1}{n}\sum_{L=1}^{L=n}(\theta_L)^2$$

or $$\theta_x = \frac{1}{\sqrt{n}}\sqrt{\theta_1^2 + \theta_2^2 + \ldots + \theta_n^2} \quad (E)$$

Hence, the output shaft angle $\theta_x$ is proportional to the square root of the sum of the squares of all the input shafts $\theta_L$.

In this arrangement, the error in setting the output shaft can be shown to be no greater than twice the maximum error in setting any one input shaft. Thus, let $\Delta\theta_1$, $\Delta\theta_2$ ... $\Delta\theta_n$ be the independent input errors and $\Delta\theta_x$ be the resultant output error, on the assumption that there is no independent error in setting $\theta_x$. Then, from Equation (E), $$(\theta_x)^2 = \frac{1}{n}(\theta_1^2 + \theta_2^2 + \ldots + \theta_n^2)$$

so that $$2(\theta_x)\Delta\theta_x = \frac{1}{n}\left\{\frac{\delta}{\delta\theta_1}(\theta_x)^2(\Delta\theta_1) + \ldots + \frac{\delta}{\delta\theta_n}(\theta_x)^2(\Delta\theta_n)\right\}$$

or $$2(\theta_x)\Delta\theta_x = \frac{1}{n}\{2\theta_1(\Delta\theta_1) + \ldots + 2\theta_n(\Delta\theta_n)\}$$

Rearranging, this becomes:

$$(\theta_x)^2\left(\frac{\Delta\theta_x}{\theta_x}\right) = \frac{1}{n}\left\{(\theta_1)^2\left(\frac{\Delta\theta_1}{\theta_1}\right) + (\theta_2)^2\left(\frac{\Delta\theta_2}{\theta_2}\right) + \ldots + (\theta_n)^2\left(\frac{\Delta\theta_n}{\theta_n}\right)\right\}$$

But $$\frac{\Delta\theta_1}{\theta_1} \ldots \frac{\Delta\theta_n}{\theta_n}$$

are the fractional or percent errors in $\theta_1, \ldots \theta_n$. If $$\frac{\Delta\theta}{\theta}$$

be taken as the maximum of all the input errors, then the last equation becomes $$(\theta_x)^2\left(\frac{\Delta\theta_x}{\theta_x}\right) \leq \frac{1}{n}\left(\frac{\Delta\theta}{\theta}\right)(\theta_1^2 + \theta_2^2 + \ldots \theta_n^2)$$

But $$(\theta_x)^2 = \frac{1}{n}(\theta_1^2 + \theta_2^2 + \ldots \theta_n^2)$$

So that, on substituting, we get $$\frac{\Delta\theta_x}{\theta_x} \leq \frac{\Delta\theta}{\theta}$$

and the output error is no greater than the maximum of any one input error; that is, the input errors do not compound or accumulate. To this dependent output error must be added any independent error in setting the output potentiometer shaft itself. If $$\frac{\Delta\theta}{\theta}$$

be assumed to be the larger of the maximum output error and the maximum of any one input error, then the total error in positioning the output shaft is no greater than $$\frac{2\Delta\theta}{\theta}$$

that is, no greater than twice the largest individual error.

Furthermore, if all arms of the bridge are made of the same materials (i. e., same type of resistance wire, for example) and subjected to like temperature variations, then the balance is not disturbed by variations in temperature and the output is independent of temperature. Any possible errors due to distributed inductance and capacitance can be eliminated by using a D. C. voltage source and a chopper for the servo amplifier. Also, any error due to the null servo can be made negligibly small by using a servo amplifier between motor 23 and tubes 17, of very high gain.

Commercially available potentiometers have total travel angles matchable within .008%, and total resistances matchable within 0.25%, and settable within .01%. Hence the present bridge can be made to extract the square root of the sum of any number of squared quantities with a limiting error of .02%, if the inequalities in resistance and total angles can be matched. Assuming that all independent input errors are randomly distributed, the statistical error is 1/3 of the limiting error, or about .0067%.

Figure 4:
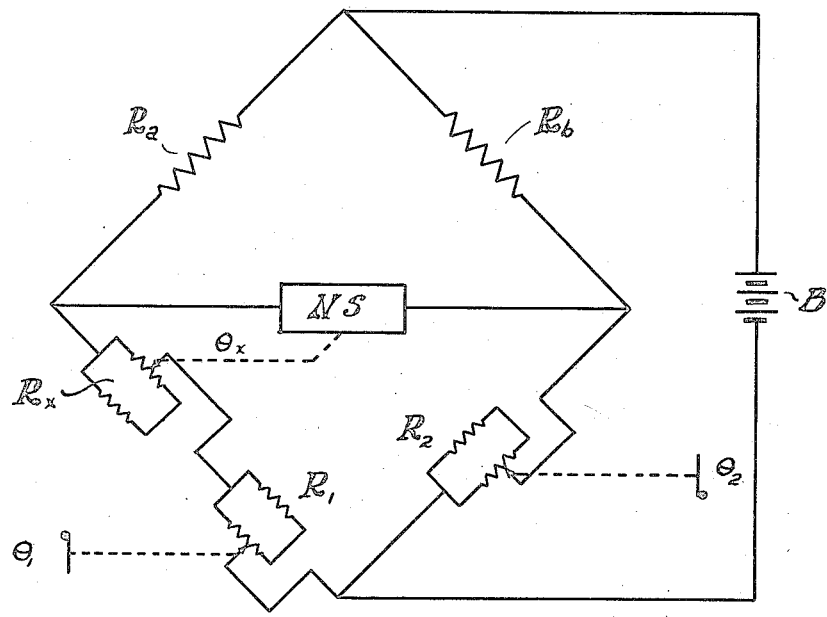
Figure 4 is a schematic circuit diagram for deriving the root of the difference of two squares.

Figure 4 shows how the scheme described above may be used to extract the square root of the difference between two squares. In this case, one input quadratic resistor R and the output quadratic resistor $R_x$ are in the same bridge arm, while another input quadratic resistor $R_2$ is in a different arm. Then, upon balance, $$\theta_1^2 + \theta_x^2 = \theta_2^2$$

or $$\theta_x = \sqrt{\theta_2^2 - \theta_1^2}$$

The above arrangements have the inconvenience of requiring closely matched potentiometers and resistors, matched both in resistance and in travel angle. According to a feature of the present invention, a trimming arrangement is provided which avoids this inconvenience. This arrangement may be explained by reference to Figure 5.

Figure 5:
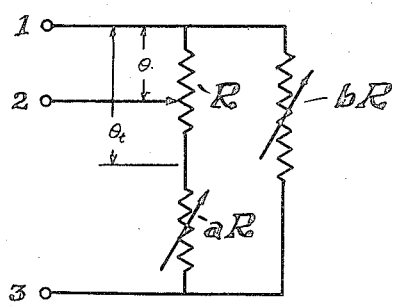
Figure 5 is a schematic diagram of a circuit showing trimming adjustment according to a feature of the present invention.

In Figure 5, a potentiometer of resistance R is in series with a resistor of value $aR$, where $a$ is merely a numerical factor whose value is determined as discussed below. This series combination is shunted by a resistor $bR$, $b$ being another such numerical factor. Then $$R_{23} = \frac{\left\{aR + R\left(1-\frac{\theta}{\theta_t}\right)\right\}\left\{bR + R\left(\frac{\theta}{\theta_t}\right)\right\}}{\left\{aR + R\left(1-\frac{\theta}{\theta_t}\right)\right\} + \left\{bR + R\left(\frac{\theta}{\theta_t}\right)\right\}}$$

or, simplifying, $$R_{23} = \frac{R\left(1+a-\frac{\theta}{\theta_t}\right)\left(b+\frac{\theta}{\theta_t}\right)}{1+a+b} \quad (F)$$

where $a$ and $b$ have no specified values. Now let $b = a+1$. Then $$R_{23} = \frac{R}{2b}\left\{b^2 - \left(\frac{\theta}{\theta_t}\right)^2\right\} \quad (G)$$

where $b$ is still unspecified.

If it now be assumed that in Figure 2 each of the quadratic resistors is of the form of Figure 5, and assuming only three inputs, then, with each R, $\theta_t$ and $b$ different from the others, the bridge balance equation becomes $$\frac{\dfrac{R_1}{2b_1}\left\{b_1{}^2-\left(\dfrac{\theta_1}{\theta_{t_1}}\right)^2\right\}+\dfrac{R_2}{2b_2}\left\{b_2{}^2-\left(\dfrac{\theta_2}{\theta_{t_2}}\right)^2\right\}+\dfrac{R_3}{2b_3}\left\{b_3{}^2-\left(\dfrac{\theta_3}{\theta_{t_3}}\right)^2\right\}}{R_a}=\dfrac{\dfrac{R_x}{2b_x}\left\{b_x{}^2-\left(\dfrac{\theta_x}{\theta_{t_x}}\right)^2\right\}}{R_b} \quad (H)$$

By expanding and rearranging, this becomes $$(R_1b_1+R_2b_2+R_3b_3)-\left\{\frac{R_1}{b_1}\left(\frac{\theta_1}{\theta_{t_1}}\right)^2+\frac{R_2}{b_2}\left(\frac{\theta_2}{\theta_{t_2}}\right)^2+\frac{R_3}{b_3}\left(\frac{\theta_3}{\theta_{t_3}}\right)^2\right\}$$
$$=\frac{R_aR_xb_x}{R_b}-\frac{R_aR_x}{R_bb_x}\left(\frac{\theta_x}{\theta_{t_x}}\right)^2 \quad (H\text{-}2)$$

If now we let $$R_1b_1+R_2b_2+R_3b_3=\frac{R_aR_xb_x}{R_b} \quad (H\text{-}3)$$

with $b_1$, $b_2$, $b_3$, $b_x$, $R_a$, $R_b$ still unspecified, then Equation H-2 becomes $$\frac{R_1}{b_1}\left(\frac{\theta_1}{\theta_{t_1}}\right)^2+\frac{R_2}{b_2}\left(\frac{\theta_2}{\theta_{t_2}}\right)^2+\frac{R_3}{b_3}\left(\frac{\theta_3}{\theta_{t_3}}\right)^2=\frac{R_aR_x}{R_bb_x}\left(\frac{\theta_x}{\theta_{t_x}}\right)^2 \quad (H\text{-}4)$$

Now, by selecting $b_1$, $b_2$, $b_3$, $b_x$ so that $$\frac{R_1}{b_1(\theta_{t_1})^2}=\frac{R_2}{b_2(\theta_{t_2})^2}=\frac{R_3}{b_3(\theta_{t_3})^2}=K \quad (H\text{-}5)$$

where K is constant, then H-4 becomes $$\theta_x{}^2=\theta_1{}^2+\theta_2{}^2+\theta_3{}^2$$

as is desired. Hence, if Equations H-5 and H-3 can be satisfied by suitable values of $b_1$, $b_2$, $b_3$ and $b_x$, the computer solves the desired equation even though all resistances and all total travel angles are different. From H-5, $$\left.\begin{array}{l}b_1=\dfrac{R_1}{K\theta_{t_1}{}^2}\\[4pt]b_2=\dfrac{R_2}{K\theta_{t_2}{}^2}\\[4pt]b_3=\dfrac{R_3}{K\theta_{t_3}{}^2}\\[4pt]b_x=\dfrac{R_x}{K\theta_{t_x}{}^2}\end{array}\right\} \quad (H\text{-}6)$$

Substituting these first three Equations of H-6 into H-3, $$\frac{1}{K}\left\{\left(\frac{R_1}{\theta_{t_1}}\right)^2+\left(\frac{R_2}{\theta_{t_2}}\right)^2+\left(\frac{R_3}{\theta_{t_3}}\right)^2\right\}=\frac{R_aR_x}{R_b}b_x \quad (H\text{-}7)$$

From H-5, $$K=\frac{R_aR_x}{R_bb_x(\theta_{t_x})^2} \quad (H\text{-}7A)$$

Substituting this in H-7 and simplifying, $$\frac{R_a}{R_b}=\frac{\theta_{t_x}}{R_x}\sqrt{\left(\frac{R_1}{\theta_{t_1}}\right)^2+\left(\frac{R_2}{\theta_{t_2}}\right)^2+\left(\frac{R_3}{\theta_{t_3}}\right)^2} \quad (H\text{-}8)$$

Substituting H-7A into H-6, $$\left.\begin{array}{l}b_1=b_x\dfrac{R_b}{R_a}\dfrac{R_1}{R_x}\left(\dfrac{\theta_{t_x}}{\theta_{t_1}}\right)^2\\[4pt]b_2=b_x\dfrac{R_b}{R_a}\dfrac{R_2}{R_x}\left(\dfrac{\theta_{t_x}}{\theta_{t_2}}\right)^2\\[4pt]b_3=b_x\dfrac{R_b}{R_a}\dfrac{R_3}{R_x}\left(\dfrac{\theta_{t_x}}{\theta_{t_3}}\right)^2\end{array}\right\} \quad (H\text{-}9)$$

Equations H-8 and H-9 now permit all the terms to be determined. From H-8, $$\frac{R_a}{R_b}$$

is calculated from the known characteristics of the various potentiometers. Then any desired value of $b_x$ is selected, and H-9 gives the values of $b_1$, $b_2$, $b_3$. From these "$b$" values, the corresponding "$a$" values are derived, since $a=b-1$.

This permits each of the precision trimming resistors "$aR$" and "$bR$" to be calculated and made or set to an accuracy limited only by the accuracy in measuring "$R$" and "$\theta_t$" and in making or setting precision resistors.

While the foregoing gives a method of calculating the required trimmer values, they can also be set by measurements. Thus, a known problem can be selected, and $\theta_1$, $\theta_2$, $\theta_3$ are set. Also, $$\frac{R_a}{R_b}$$

is set for the optimum value of approximately $\sqrt{3}$. Then $b_xR_x$ is adjusted to any reasonable value, such as $2\sqrt{3}R_x$. Next $a_xR_x$ is set to the corresponding value $R_x(2\sqrt{3}-1)$. Then $b_1R_1$, $b_2R_2$, $b_3R_3$ and $a_1R_1$, $a_2R_2$, $a_3R_3$ are adjusted in any order to approximately the values $$b_1R_1 \cong \frac{b_xR_1}{\sqrt{3}}$$

$$b_2R_2 \cong \frac{b_xR_2}{\sqrt{3}}$$

$$b_3R_3 \cong \frac{b_xR_3}{\sqrt{3}}$$

and $$a_1R_1=\left(\frac{b_x}{\sqrt{3}}-1\right)R_1$$

$$a_2R_2=\left(\frac{b_x}{\sqrt{3}}-1\right)R_2$$

$$aR=\left(\frac{b_x}{\sqrt{3}}-1\right)R_3$$

These values are then readjusted to provide the required answer $\theta_x$ for the known problem, within the accuracy of reading and setting.

Accordingly, in this way the limitations of the bridge of Fig. 2, requiring identical resistors and potentiometers, is avoided, and not only can unavoidable deviations in such resistors and potentiometers be compensated for, but also dissimilar units may be used, as desired.

The term "quadratic resistor" as used in the foregoing specification and in the following claims means a variable resistor whose resistance value is a quadratic function of the adjustment of its control member, examples being the arrangements in Figs. 1 and 5.

It will be understood that the present invention is not limited in any way to the use of but three inputs, since any desired number may be used similarly.

Also, the trimming feature just described is equally applicable to the arrangement of Fig. 4 for computing the root of difference of squares.

What is claimed is:

1. Computing apparatus for determining the square root of the sum of the square of a plurality of quantities, comprising a bridge circuit having four arms and a pair of diagonals, fixed resistors of resistance value $R_a$ and $R_b$ in two adjoining ones of said arms, a plurality of input quadratic resistors connected in series in another arm of said bridge, a further output quadratic resistor in the fourth arm of said bridge, each of said quadratic resistors comprising a linear potentiometer and a resistor in a series circuit with each such potentiometer and a shunt resistor connected across each such series circuit, the terminals for each such quadratic resistor being formed by the variable tap of its respective potentiometer and the junction of its two resistors, each of said quadratic resistors having a control member connected to the variable tap of its respective potentiometer, each position of each such control member being representative of a value of a respective one of said quantities, a source of voltage connected across one of said bridge diagonals, a null servo connected across the other of said bridge diagonals, said servo output being connected to actuate the control member for said output quadratic resistor, said linear potentiometers having total travel angles for their variable taps and resistances related to those of said fixed shunt and series resistors by the following equations:

$$\frac{R_a}{R_b} = \frac{\theta_{t_x}}{R_x} \sqrt{\sum_{L=1}^{L=n} \left(\frac{R_L}{\theta_{t_L}}\right)^2}$$

and $$b_L = b_x \frac{R_b}{R_a} \frac{R_L}{R_x} \left(\frac{\theta_{t_x}}{\theta_{t_L}}\right)^2$$

where $\theta_{t_L}$ and $\theta_{t_x}$ are the respective total travel angles for the Lth potentiometer of said input quadratic resistors and the potentiometer of said output quadratic resistors, $R_L$ and $R_x$ are respectively the resistances of said Lth input and output potentiometers, $b_L R_L$ and $b_x R_x$ are respectively the resistances of the shunt resistors of said Lth input and output quadratic resistors, and $a_L R_L$ and $a_x R_x$ respectively the resistances of the series resistors of said Lth input and output quadratic resistors, where $$b_L = 1 + a_L$$

and $$b_x = 1 + a_x$$

and L has successively each of the values 1 to $n$, whereby said servo positions said output quadratic resistor potentiometer to a position corresponding to the square root of the sum of the squares of the quantities represented by said input quadratic resistors.

2. Apparatus as in claim 1 wherein said respective values of $R_L$ are independent of one another.

3. Apparatus as in claim 1 wherein said respective valves of $R_L$ are equal to one another and to $R_x$.

4. Computing apparatus for determining the square root of the sum of the squares of a plurality of quantities, comprising a bridge circuit having four arms and a pair of diagonals, fixed resistors of resistance value $R_a$ and $R_b$ in two adjoining ones of said arms, a plurality of input quadratic resistors connected in series in another arm of said bridge, a further output quadratic resistor in the fourth arm of said bridge, each of said quadratic resistors comprising a linear potentiometer and a resistor in a series circuit with each such potentiometer and a shunt resistor connected across each such series circuit, the terminals for each such quadratic resistor being formed by the variable tap of its respective potentiometer and the junction of its two resistors, each of said quadratic resistors having a control member connected to the variable tap of its respective potentiometer, each position of each such control member being representative of a value of a respective one of said quantities, a source of voltage connected across one of said bridge diagonals, a null servo connected across the other of said bridge diagonals, said servo output being connected to actuate the control member for said output quadratic resistor, each of said shunt resistors having a resistance equal to the sum of the total resistance of its respective potentiometer plus that of its respective series resistance.

5. Computing apparatus comprising a bridge circuit having four arms and a pair of diagonals, fixed resistors of resistance value $R_a$ and $R_b$ in two adjoining ones of said arms, a plurality of quadratic resistors arranged in the other arms of said bridge circuit, each of said quadratic resistors comprising a linear potentiometer and a resistor in a series circuit with each such potentiometer and a shunt resistor connected across each such series circuit, the terminals for each such quadratic resistor being formed by the variable tap of its respective potentiometer and the junction of its two resistors, each of said quadratic resistors having a control member connected to the variable tap of its respective potentiometer, each position of each such control member being representative of a numerical value of a quantity, a source of voltage connected across one of said bridge diagonals, a null servo connected across the other of said bridge diagonals, said servo output being connected to actuate one of said control members and the other control members being adjustable to set in desired values of input quantities, each of said shunt resistors having a resistance equal to the resistance of its respective potentiometer plus that of its respective series resistance.

6. A computer comprising a self-balancing bridge circuit having four arms, two adjacent arms being formed by fixed resistors and the other arms being formed by variable quadratic resistors, one of said other arms having a plurality of said quadratic resistors in series, a null servo connected across one diagonal of said bridge and having its output coupled to one of said quadratic servos, a source of voltage coupled across the other diagonal of said bridge, each of said quadratic resistors comprising a variable potentiometer and a trimming resistor in series with each such potentiometer for compensating for variations in the characteristics of said potentiometers and a resistor in shunt with each series circuit formed by a potentiometer and trimming resistor.

References Cited in the file of this patent
UNITED STATES PATENTS 2,614,251    Ergen    Oct. 14, 1952
2,673,030    Isserstedt    Mar. 23, 1954

FOREIGN PATENTS

"Electronic Instruments," Radiation Laboratory Series (Green-Wood, Holdam, Macrae), published by McGraw-Hill, 1948 (page 38 relied on).

"Bridge Type Electrical Computers" (Ergen), published by the Review of Scientific Instruments, volume 18, No. 8, August 1947.